(12) United States Patent
Takahashi et al.

(10) Patent No.: US 6,343,876 B2
(45) Date of Patent: *Feb. 5, 2002

(54) EASY-TO-OPEN PACKAGE HAVING SEAL OPENING NOTCH

(75) Inventors: Yoshimori Takahashi; Yasuhito Miyazawa; Yuuichi Maruyama, all of Nagaoka (JP)

(73) Assignee: Nippon Seiki Co., Ltd., Niigata (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/297,352

(22) PCT Filed: Aug. 28, 1998

(86) PCT No.: PCT/JP98/03871

§ 371 Date: Apr. 30, 1999

§ 102(e) Date: Apr. 30, 1999

(87) PCT Pub. No.: WO99/12812

PCT Pub. Date: Mar. 18, 1999

(30) Foreign Application Priority Data

Sep. 8, 1997 (JP) ............................................. 9-242361

(51) Int. Cl.[7] ................................................. B65D 33/36
(52) U.S. Cl. ..................... 383/200; 53/133.8; 116/16.17
(58) Field of Search ............................... 383/200, 208, 383/207; 53/133.8, 412; 229/123.2; 116/DIG. 17, 205; 206/532, 469, 484

(56) References Cited

U.S. PATENT DOCUMENTS

| | | | | | |
|---|---|---|---|---|---|
| 2,329,360 | A | * | 9/1943 | Salfisberg | 383/200 X |
| 2,499,528 | A | * | 3/1950 | Reitzes | 383/208 |
| 2,851,212 | A | * | 9/1958 | Parmer | 383/200 |
| 3,146,912 | A | * | 9/1964 | Twersky | 383/200 X |
| 3,272,424 | A | * | 9/1966 | Rodkey | 383/208 |
| 3,301,395 | A | * | 1/1967 | Swezey | 383/208 X |
| 3,397,835 | A | * | 8/1968 | Henning | 383/208 |
| 3,456,784 | A | * | 7/1969 | Sirago | |
| 3,809,220 | A | * | 5/1974 | Arcudi | 383/200 X |
| 3,882,999 | A | * | 5/1975 | Wellman | 383/202 X |

(List continued on next page.)

FOREIGN PATENT DOCUMENTS

| | | | | |
|---|---|---|---|---|
| EP | 494582 | * | 7/1992 | 383/200 |
| GB | 690614 | * | 4/1953 | 383/200 |
| GB | 797584 | * | 7/1958 | 383/200 |
| JP | 6122471 | * | 4/1953 | 383/200 |
| JP | 5-254551 | * | 7/1958 | 383/200 |
| JP | 53-12880 | | 5/1978 | |
| JP | 53-69775 | | 6/1978 | |
| JP | 62-174066 | | 11/1987 | |
| JP | 242746 | * | 9/1990 | 383/200 |
| JP | 4-208450 | | 7/1992 | |

*Primary Examiner*—Stephen P. Garbe
*Assistant Examiner*—Robin A Hylton
(74) *Attorney, Agent, or Firm*—McDermott, Will & Emery (57) ABSTRACT

An easily openable sealed package bag (P) which hermetically seals a material to be packed (W), such as liquid, powder and viscous material, by longitudinally and laterally sealing three or four sides of a package film (F). A seal opening notch (N) comprising a cut is formed in a sealed portion (S) of the package bag (P) in such a way as to extend in a direction of depth of the sealed portion (S). The sealed portion (S) is also formed with a bent portion (B) adjacent to the seal opening notch (N). The easily openable sealed package bag is capable of enhancing the ease with which the package bag can be opened and the ease with which a seal opening portion can be identified by sight or by touch, without producing cut chips of the package bag. An apparatus for manufacturing such easily openable sealed package bags is also provided.

12 Claims, 11 Drawing Sheets

U.S. PATENT DOCUMENTS

| | | | | |
|---|---|---|---|---|
| 3,921,805 A | * | 11/1975 | Compere | 206/484 X |
| 4,011,949 A | * | 3/1977 | Braber et al. | 206/484 X |
| 4,159,771 A | * | 7/1979 | Komatsu et al. | 206/469 X |
| 4,557,385 A | * | 12/1985 | Robinson | 383/208 X |
| 4,981,374 A | * | 1/1991 | Rutter et al. | 383/903 X |
| 5,060,803 A | * | 10/1991 | Beer et al. | 383/200 |
| 5,169,696 A | * | 12/1992 | Lang et al. | 383/200 X |
| 5,222,813 A | * | 6/1993 | Kopp et al. | 383/200 |
| 5,371,997 A | * | 12/1994 | Kopp et al. | 53/133.8 X |
| 5,408,807 A | * | 4/1995 | Lane, Jr. et al. | 53/133.8 X |
| 5,511,665 A | * | 4/1996 | Dressel et al. | 206/484 X |
| 5,560,538 A | * | 10/1996 | Sato et al. | 383/200 X |
| 6,036,016 A | * | 3/2000 | Arnold | 206/469 X |

* cited by examiner

EASY-TO-OPEN PACKAGE HAVING SEAL OPENING NOTCH

TECHNICAL FIELD

The present invention relates to an easily openable sealed package bag that can suitably be opened by breaking open a package film as a packaging material with a finger tip and also to an apparatus for manufacturing the easily openable sealed package bags.

BACKGROUND OF THE INVENTION

A package bag has conventionally been made by vertically or laterally sealing three or four sides of a package film made of a packaging material, such as a synthetic resin film or a laminated material formed by laminating the synthetic resin film and an aluminum foil or the like. The package bag is filled with a material to be packed, such as liquids, powders or viscous materials, before being hermetically sealed.

To open the package bag, therefore, it is common practice to cut a sealed portion of the package film as the packaging material with a knife or scissors or break it open with a finger tip. When the package bag is to be cut with a knife or scissors, the opening procedure is troublesome as it requires a tool. When the package film is to be ruptured with a finger tip, the opening of the package film may not be accomplished easily.

Figure 12:
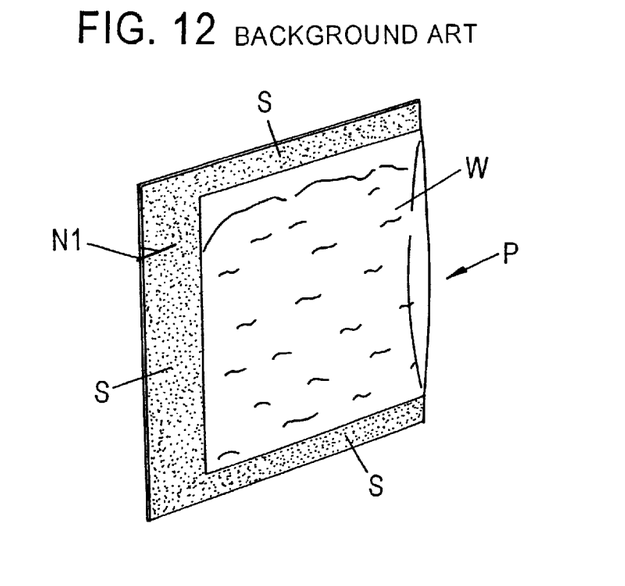
FIG. 12 is a front view showing an example of a conventional package bag formed with an I-notch.
Figure 13:
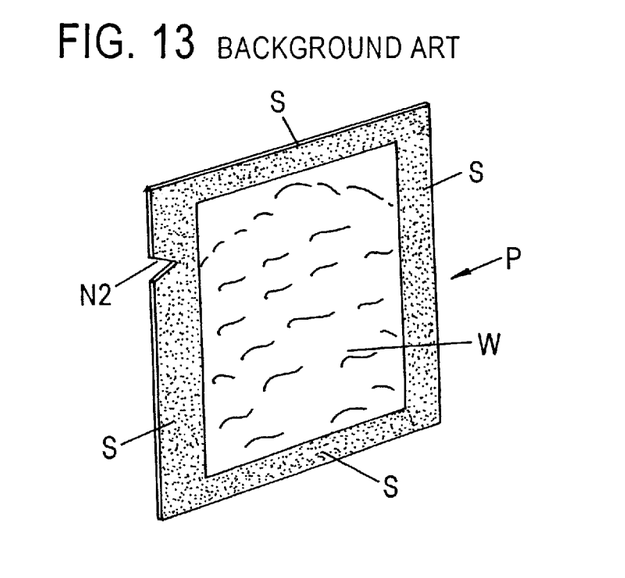
FIG. 13 is a front view showing an example of a conventional package bag formed with a V-notch.
Figure 14:
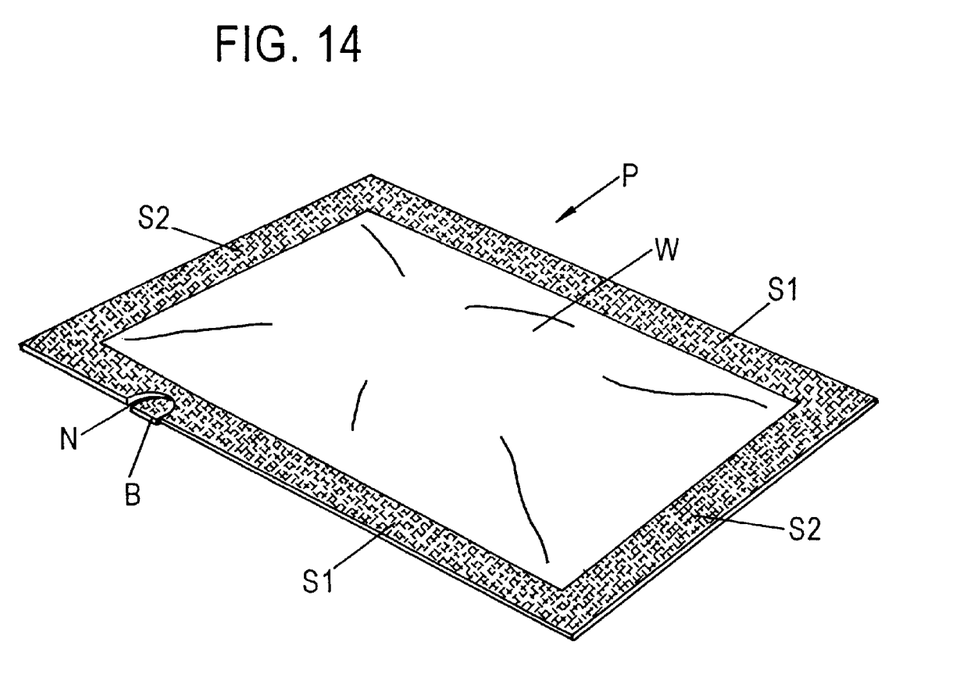
FIG. 14 is an essential-portion perspective view of a package bag according to another embodiment of the invention.

For these reasons, the package bag has recently been formed with a seal opening notch, which comprises a cut, at a sealed portion of the package bag to make it easy to break open the package bag. Two types of opening notch are employed in general. For example, as shown in FIG. 12, a package bag P with its three sides sealed is formed with a simple cut or a so-called I-notch N1 at a sealed portion S. Alternatively, as shown in FIG. 13, a package bag P with its four sides sealed is formed with a so-called V-notch N2, which is formed by making a V-shaped cut, at a sealed portion S. The opening notch is formed in the package bag P in this way.

In making an opening notch, although the I-notch N1 offers the advantage of simple manufacturing because of a simple shape of the cut, there is a drawback that, because the I-notch N1 is formed by making a simple cut at the sealed portion S of the package bag P, the edge portion of the opening I-notch N1 is aligned with the side of the bag and may not be recognized easily, making it difficult to quickly locate the position of the I-notch N1.

In this respect, the V-notch N2 which is a V-shaped cut is easily recognized because of its shape even by a person with failed eyesight. The use of the V-notch as an opening notch however is currently not applied to food product packages in which materials W to be filled in the package bag P are foods such as sauce, soup and soy sauce, because when the V-notch N2 is to be formed in the sealed portion S of the package bag P, the sealed portion S of the package bag P needs to be cut in the shape of letter V during the notch forming process, producing cut chips which in turn may adhere to the product package bag P.

It is therefore an object of the invention to provide an easily openable sealed package bag which can improve the level of ease with which the package bag can be opened, without producing cut chips of the package bag, and which can enhance the level of ease with which the opening portion can be located with sight or feel. It is also an object of the invention to provide an apparatus for manufacturing such an easily openable sealed package bag.

DISCLOSURE OF THE INVENTION

In a package bag that hermetically seals a material to be packed, such as liquid, powder and viscous material, by longitudinally and laterally sealing three or four sides of a package film, the package according to the invention is characterized by: a seal opening notch comprising a cut formed in a sealed portion of the package bag in such a manner as to extend in a direction of depth of the sealed portion; and a bent portion formed in the sealed portion adjacent to the seal opening notch comprising a cut. A resulting step formed by the bent portion allows the user to identify a seal opening notch position easily.

Further, the sealed portion of the package bag is formed with a seal opening notch comprising a cut which extends in a direction of depth of the sealed portion, and also with a bent portion (stepped portion) which extends from the deepest part of the seal opening notch comprising a cut toward an outer edge of the sealed portion. This structure easily forms a step at the edge portion where the notch is cut, making it possible to easily locate the notch portion comprising a cut. Further, the configuration comprising the seal opening notch and the bent portion (stepped portion) easily forms, by bending, a step with an almost V- or U-shaped width, thereby improving the ease with which the seal opening notch position can be distinguished by sight as well as by touch.

Further, in a packaging machine that continuously makes package bags, the apparatus is characterized in that a notch forming mechanism is provided which has a pair of opposing rolls for clamping and transporting the longitudinally sealed portion of the continuously fed package bags; and that a circumferential surface of at least one of the opposing rolls is formed with a protruding cutting edge that makes a seal opening notch comprising a cut in the longitudinally sealed portion of the package bags in such a way that the seal opening notch extends in a direction of depth of the longitudinally sealed portion, with the other roll functioning as a receiving roll, and the circumferential surface is also formed with a protruding bending edge that forms a bent portion in the longitudinally sealed portion adjacent to the seal opening notch. This construction provides an apparatus for manufacturing easily openable sealed package bags that allow the user to identify the seal opening portion while preventing cut chips from being produced as a result of making notches.

Further, in a packaging machine that continuously makes package bags, the apparatus is characterized in that a notch forming mechanism is provided which has a pair of opposing rolls for clamping and transporting the longitudinally sealed portion of the continuously fed package bags; that a circumferential surface of at least one of the opposing rolls is formed with a protruding cutting edge that makes a seal opening notch comprising a cut in the longitudinally sealed portion of the package bags in such a way that the seal opening notch extends in a direction of depth of the longitudinally sealed portion, with the other roll functioning as a receiving roll, and the circumferential surface is also formed with a protruding bending edge that extends continuously from the cutting edge at a position corresponding to the deepest part of the seal opening notch toward an outer edge of the longitudinally sealed portion in order to form a bent portion (stepped portion) in the longitudinally sealed portion; and that a height of a tip of the bending edge is set slightly lower than a height of a tip of the cutting edge. This construction provides an apparatus for manufacturing easily openable sealed package bags that allow the user to identify the seal opening portion while preventing cut chips from being produced as a result of making notches.

BEST MODE FOR CARRYING OUT THE INVENTION

Now, one embodiment of the invention will be described by referring to the accompanying drawings. An easily openable sealed package bag and the outline construction and operation of a filling and packaging machine, which is an apparatus for manufacturing the easily openable sealed package bag with a package film, will be explained with reference to FIG. 1 through FIG. 7.

Figure 1:
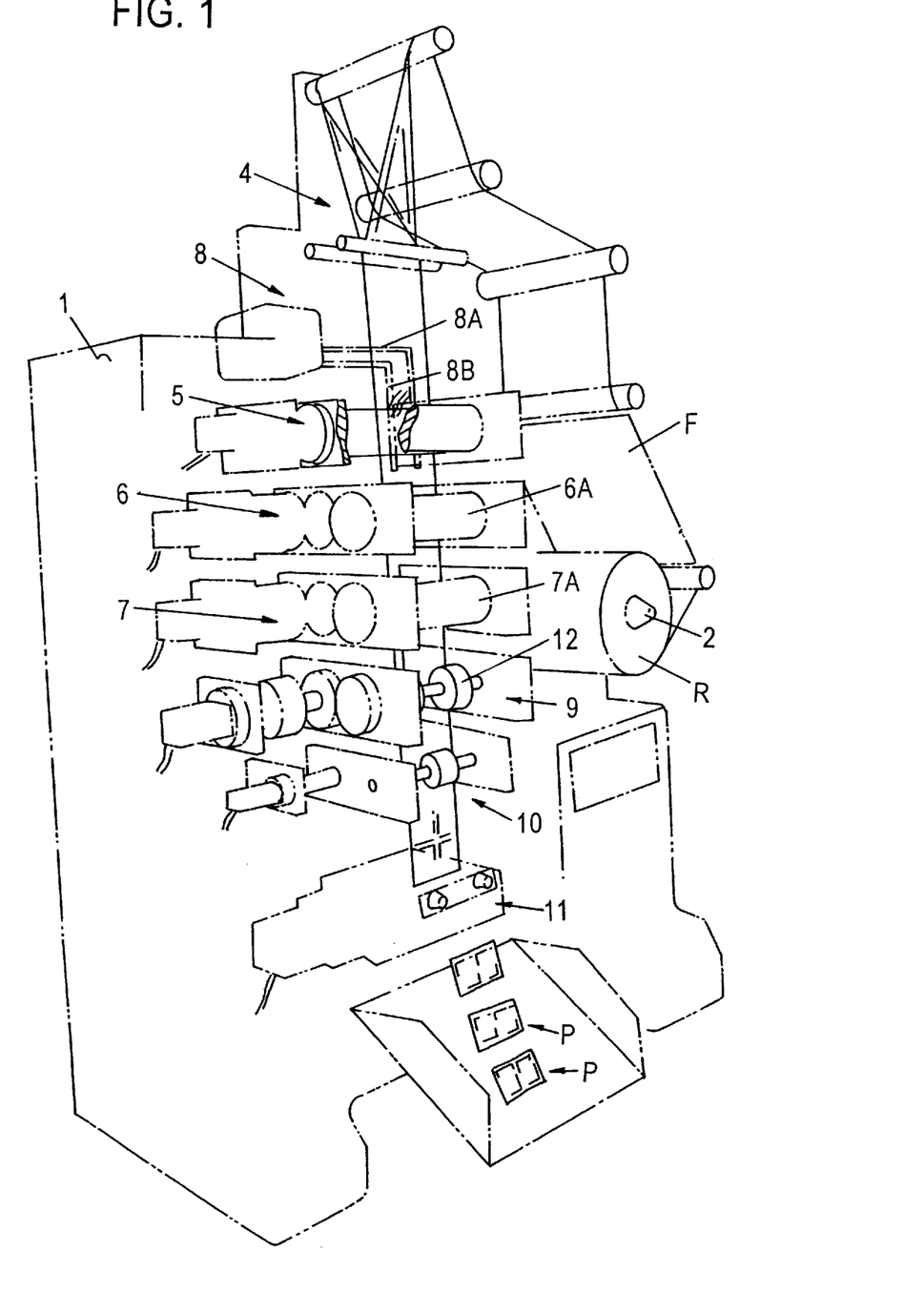
FIG. 1 is a perspective view showing an overall outline of a filling and packaging machine.
Figure 2:
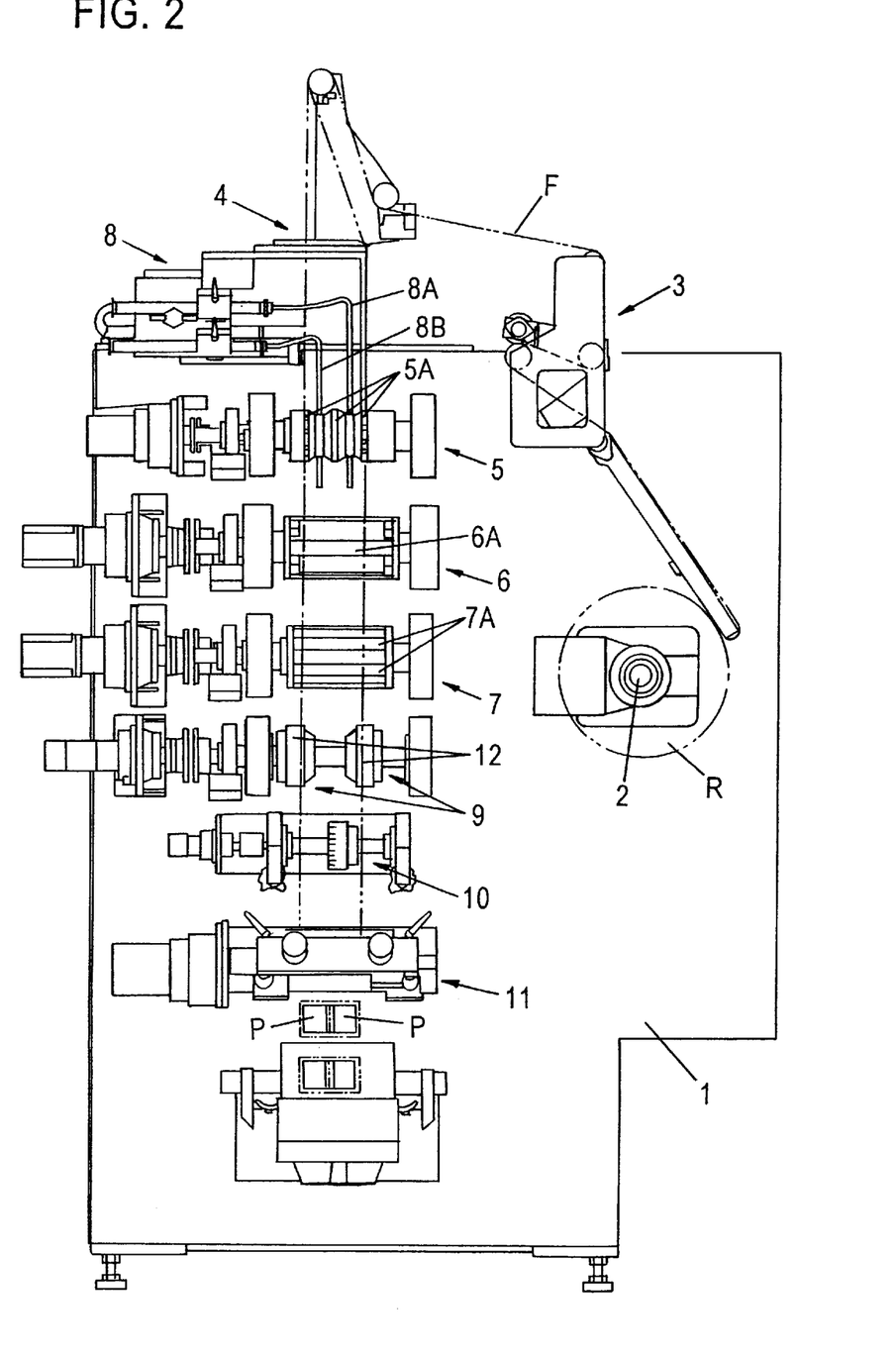
FIG. 2 is a front view showing an overall outline of the filling and packaging machine of FIG. 1.

Referring to these figures, in the overall outline construction of the filling and packaging machine, reference numeral 1 represents a frame of the filling and packaging machine, in the side portion of which is provided a support frame 2 on which a roll R of film F is removably mounted.

The film F drawn out and guided from the film roll R is given a predetermined tension as it is guided through a film guide mechanism 3, and is then pulled upward to a film folding mechanism 4 disposed at the upper part of the frame 1 where the film is folded in two along its length and from which the folded film is drawn downward and guided.

In this embodiment, the film F folded in two and drawn downward is longitudinally heat-sealed at a folded edge portion, an intermediate portion and an opposite edge portion (at left and right edge portions and an intermediate portion) by a pair of longitudinal heat seal rolls 5A of a longitudinally sealing mechanism 5 to form longitudinally sealed portions S1. Then, a first laterally sealing mechanism 6 and a second laterally sealing mechanism 7, both disposed below the longitudinally sealing mechanism 5, laterally heat-seal the folded film to form laterally sealed portions S2.

In this case, a pair of lateral heat seal rolls 6A of the first laterally sealing mechanism 6 laterally heat-seal the folded film at predetermined intervals to form the laterally sealed portions S2. The laterally sealed portions S2 each form bottoms of bottomed cylinders, which will make two left and right parallelly arranged package bags. The film F formed into a bottomed cylinder is filled with a material to be packed W, which is supplied from filling nozzles 8A, 8B of a filling mechanism 8. Then, after the film F is fed, the lateral heat seal rolls 6A of the first laterally sealing mechanism 6 laterally heat-seal bag inlet portions of the film F to form laterally sealed portions S2, which seal the material to be packed W. These laterally sealed portions S2 are further sealed by a pair of lateral heat seal rolls 7A of the second laterally sealing mechanism 7 to seal four sides of the film F, and the package bags P thus formed are carried continuously downward in a connected state.

In this kind of packaging machine, below the second laterally sealing mechanism 7 is arranged a seal opening notch forming mechanisms 9, below which a perforation slitter mechanism 10 is disposed to form perforations in the center longitudinally sealed portion S1 of the left and right parallel package bags P. Further blow the perforation slitter mechanism 10 there is a cutting mechanism 11 that cuts the laterally sealed portions S2 of the vertically connected package bags P and delivers the separated package bags P.

The seal opening notch forming mechanisms 9 are provided on both edge sides of the left and right parallel package bags P. Each of the seal opening notch forming mechanisms 9 has a pair of opposing rolls 12, 12A to form seal opening notches N in each of the longitudinally sealed portions S1 provided on the both edge sides of the parallel bags. A pair of the opposing rolls 12, 12A are arranged to clamp and transport the longitudinally sealed portions S1 on the both edge sides of the continuously fed package bags P. On a circumferential surface of at least one roll 12 of the opposing rolls is formed a protruding cutting edge 13 that forms a seal opening notch N comprising a cut in the longitudinally sealed portions S1 of the package bags P in such a way that the notch extends in the direction of depth of the longitudinally sealed portions, with another roll 12A used as a receiving roll 12A. At the same time, the circumferential surface of at least one roll 12 is formed with a protruding bending edge 13A that extends continuously from the cutting edge 13 at a position corresponding to the deepest part of the seal opening notch N toward the outer edge of the longitudinally sealed portions S1 in order to form a bent portion B (stepped portion) in the longitudinally sealed portions S1. Further, as shown in FIG. 7, the height L2 of the tip of the bending edge 13A is set slightly lower than the height L1 of the tip of the cutting edge 13 so that the bent portion B (stepped portion) can be obtained in the longitudinally sealed portions S1.

Figure 3:
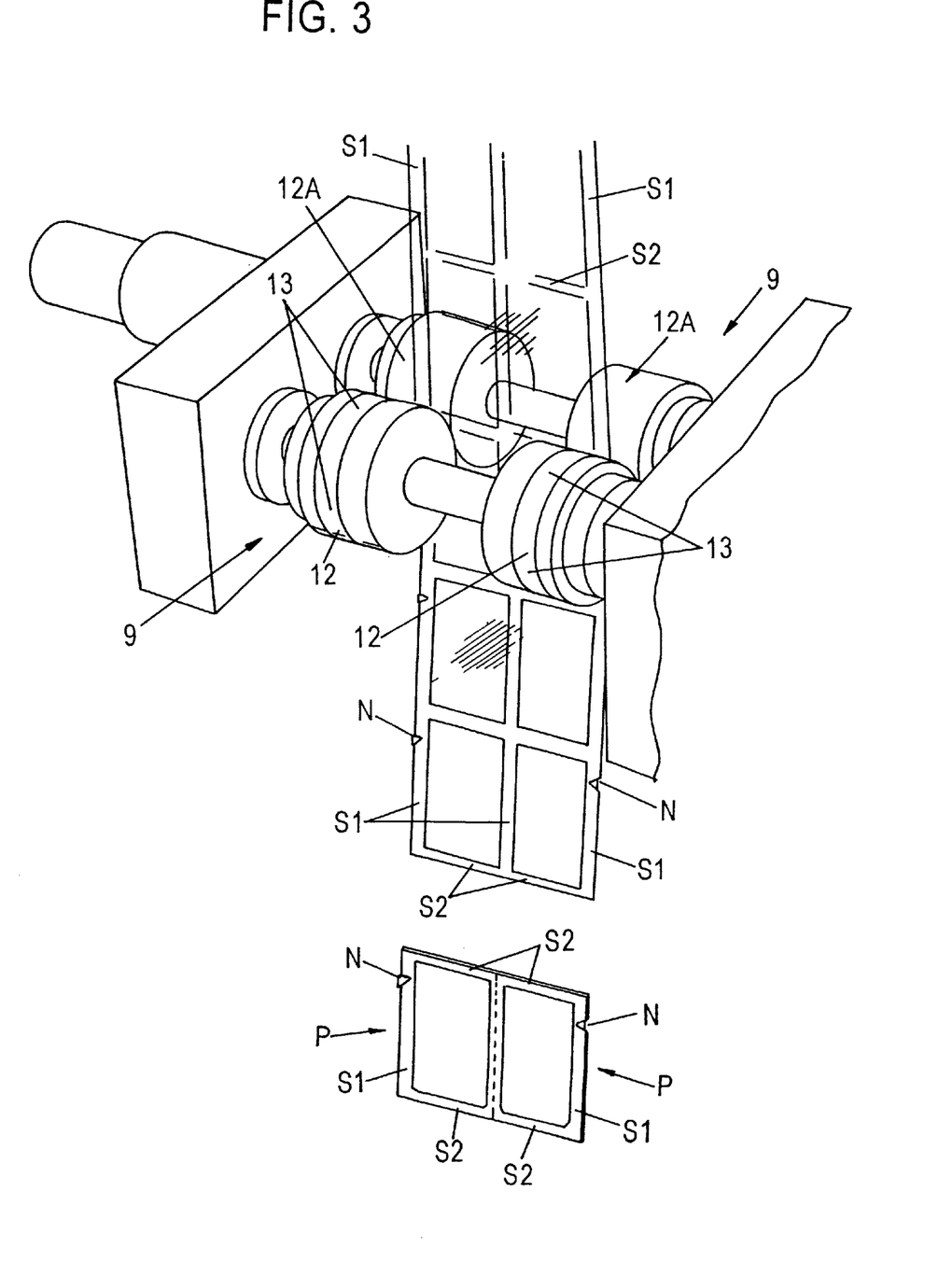
FIG. 3 is a perspective view showing a seal opening notch forming mechanism of FIG. 2.
Figure 4:
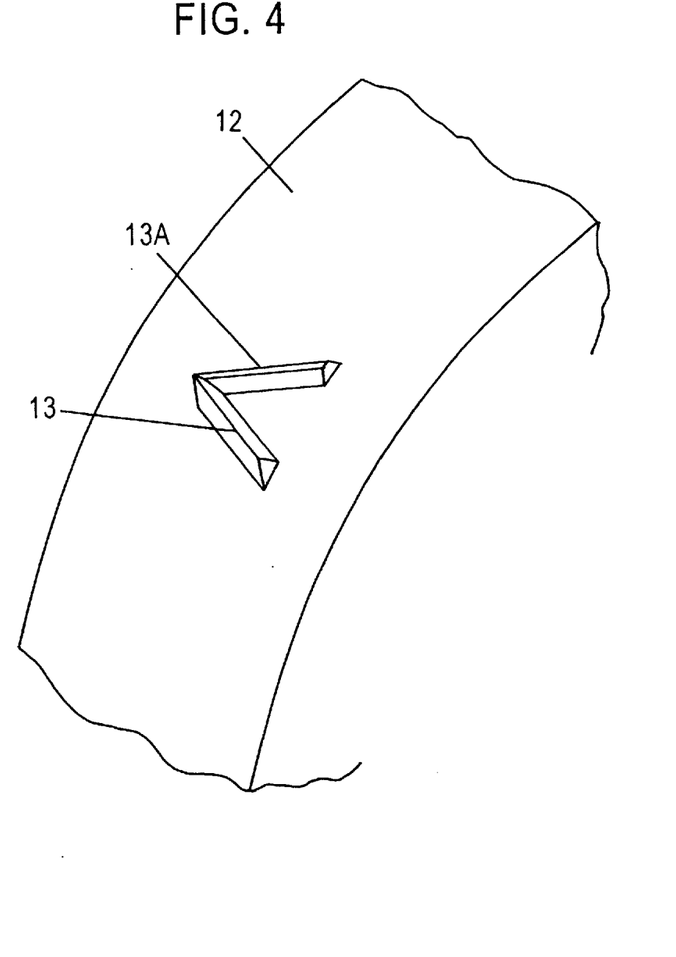
FIG. 4 is a perspective view showing a cutting edge and a bending edge, both essential parts of FIG. 3.
Figure 5:
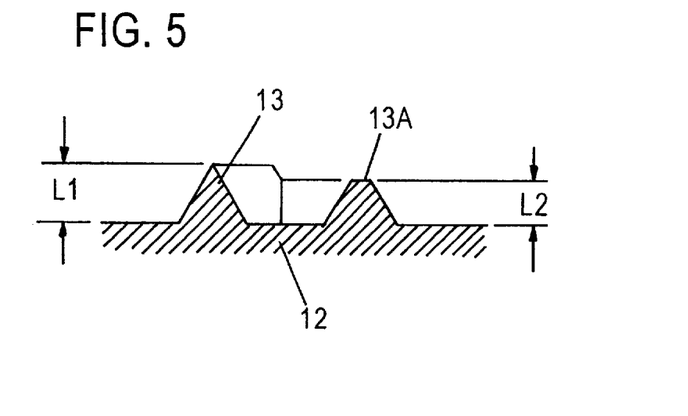
FIG. 5 is an outline cross section of the cutting edge and the bending edge of FIG. 4.
Figure 6:
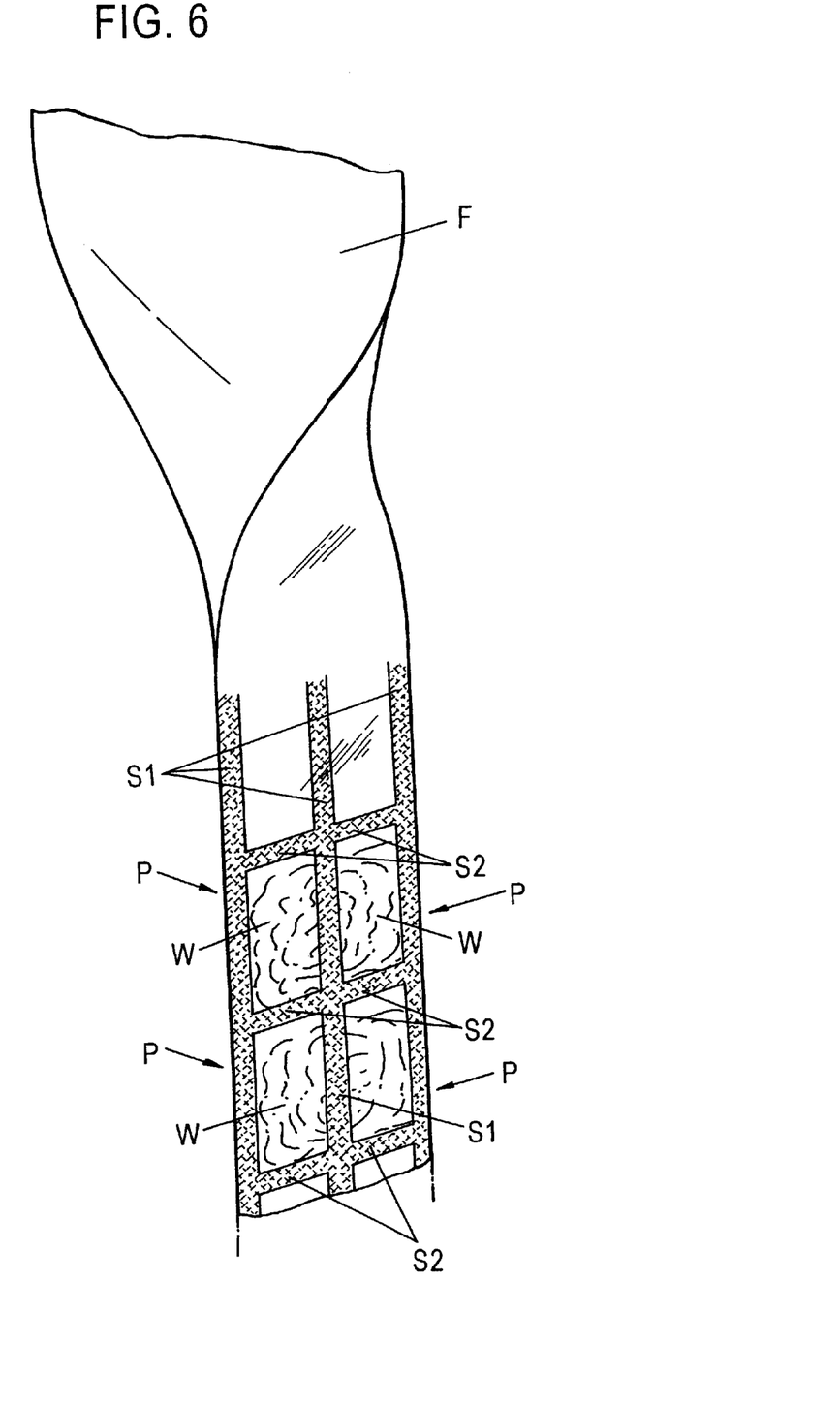
FIG. 6 is an explanatory view showing an example form of package bag into which a package film is formed by a filling and packaging machine according to one embodiment of the invention.

In the embodiment described above, the filling and packaging machine that continuously forms package bags is characterized in that the seal opening notch forming mechanisms 9 are provided that each have a pair of the opposing rolls 12, 12A for clamping and transporting the longitudinally sealed portions S1 of the continuously fed package bags P; that the circumferential surface of at least one roll 12 of the opposing rolls is formed with the protruding cutting edge 113 that forms the seal opening notch N comprising a cut in the longitudinally sealed portions S1 of the package bags P in such a way that the notch extends in the direction of depth of the longitudinally sealed portions, with another roll 12A used as a receiving roll 12A, and the circumferential surface of at least one roll 12 is also formed with a protruding bending edge 13A that extends continuously from the cutting edge 13 at a position corresponding to the deepest part of the seal opening notch N toward the outer edge of the longitudinally sealed portions S1 in order to form a bent portion B in the longitudinally sealed portions S1; and that the height L2 of the tip of the bending edge 13A is set slightly lower than the height L1 of the tip of the cutting edge 13. With this construction, the cutting edge 13 formed on the surface of one roll 12 and the circumferential surface of the receiving roll 12A or the other roll engage each other, clamping the longitudinally sealed portions S1 of the package bags P between the cutting edge 13 and the circumferential surface of the receiving roll 12A or the other roll, thus making a cut in the longitudinally sealed portions S1. As a result, a seal opening notch N is formed, which is a cut extending from the outer edge of the longitudinally sealed portions S1 in the direction of their depth. At the same time, because of the height L2 of the tip of the bending edge 13A being slightly lower than the height L1 of the tip of the cutting edge 13, the bending edge 13A clamps the longitudinally sealed portions S1 of the package bags P between it and the roll 12A and, by the clamping stress, deforms the longitudinally sealed portions S1 and bends that normally flat part of the longitudinally sealed portions S1 against which the bending edge 13A is pressed, thus irregularly shaping the edge portions where the seal opening notches N are cut.

As a result, the longitudinally sealed portions S1 of the package bags P are formed with the seal opening notches N, which are cuts extending from the outer edges of the longitudinally sealed portions S1 in the direction of their depth, as described above. At the same time, the bent portions B that extend from the deepest part of the seal opening notches N toward the outer edges of the longitudinally sealed portions S1 are formed by deformation. The edge portions where the seal opening notches N are cut are made irregular by the bent portions that are formed by deformation. The irregular stepped portion allows the user to easily recognize by sight that this is a seal opening location of the package bag P. Further, by touching the bent portion B with a finger tip, the user can feel a dent or bulge at the bent portion and decide that the irregular part is the seal opening location of the package bag P.

Figure 7:
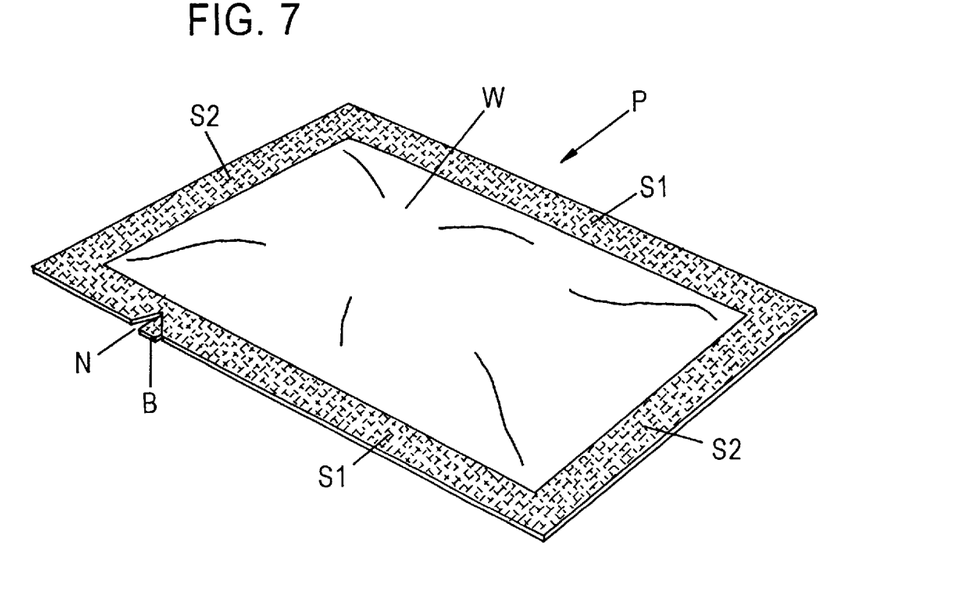
FIG. 7 is a perspective view of a package bag, an essential portion of FIG. 6.

As shown in FIG. 7, because the seal opening notch N and the bent portion B which extends from the deepest part of the seal opening notch N or cut toward the outer edge of the longitudinally sealed portion S1 are formed in the longitudinally sealed portion S1 in the shape of letter V, a stepped portion with a V-shaped width, defined by the seal opening notch N and the bent portion B, is easily formed by bending, thus improving the ease with which the seal opening notch N can be identified by sight as well as by touch.

In the embodiment as described above, because the seal opening notch N1, which comprises a cut, is formed in the longitudinally sealed portion S1 of the package bag P in such a manner as to extend in the direction of its depth, the cut chips can be prevented from being formed as they would when the conventional notch is cut. Further, because the bent portion B is formed in the longitudinally sealed portion S1 in such a way as to extend from the deepest part of the seal opening notch N1 or cut toward the outer edge of the longitudinally sealed portion S1, an easily openable sealed package bag can be provided that allows easy identification of the seal opening portion.

Further, to obtain a package bag P according to one embodiment shown in FIG. 7, the filling and packaging machine that continuously forms package bags is characterized in that the surface of a roll is formed with the protruding cutting edge 13 that forms a seal opening notch N comprising a cut in the longitudinally sealed portions S1 of the package bags P in such a way that the notch extends in the direction of depth of the longitudinally sealed portions; that the roll surface is also formed with the protruding bending edge 13A that extends continuously from the cutting edge 13 at a position corresponding to the deepest part of the seal opening notch N toward the outer edge of the longitudinally sealed portions S1 in order to form the bent portion B in the longitudinally sealed portions S1; and that the height L2 of the tip of the bending edge 13A is set slightly lower than the height L1 of the tip of the cutting edge 13. With this construction it is possible to provide an easily openable sealed package bag that allows easy identification of the seal opening portion while preventing cut chips from being produced as a result of making notches. In the embodiment, the geometry comprising the cutting edge 13 and the bending edge 13A of the seal opening notch forming mechanism 9 in the packaging machine is set according to the nearly V-shaped configuration comprising the seal opening notch N and the bent portion B.

Figure 8:
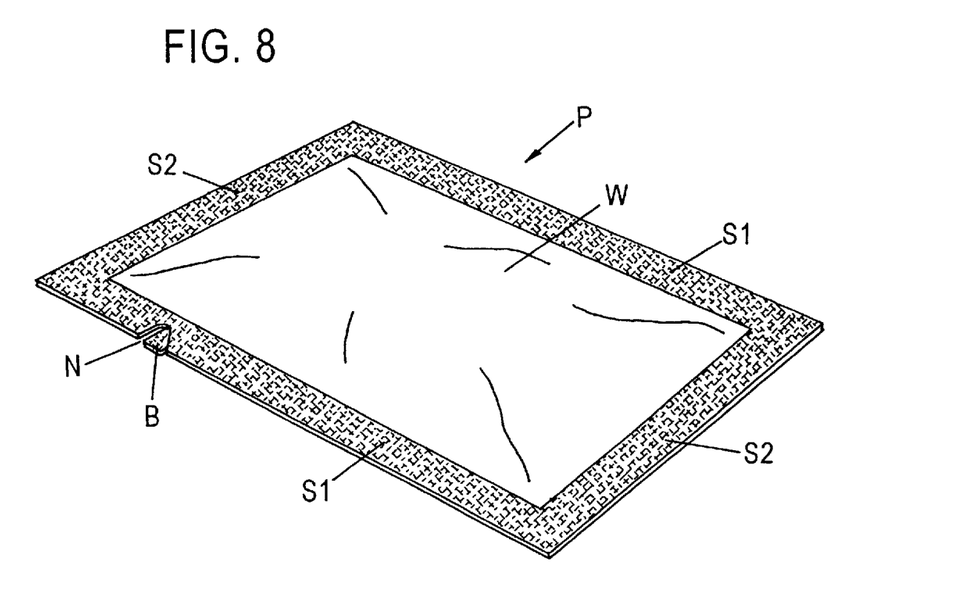
FIG. 8 is an essential-portion perspective view of a package bag according to one embodiment of the invention.

In an embodiment of the package bag P as shown in FIG. 8, the seal opening notch N, which is a cut extending in the direction of depth of the longitudinally sealed portion S1 of the package bag P, and the bent portion B, which extends from the deepest part of the seal opening notch N or cut toward the outer edge of the longitudinally sealed portion S1, are formed virtually like a letter U in the longitudinally sealed portion S1. In this case, too, as in the V-shaped configuration, because a stepped portion with an almost U-shaped width, defined by the seal opening notch N and the bent portion B, is formed by bending, the stepped portion improves the ease with which the seal opening notch N can be located by sight as well as by touch. The geometries of the cutting edge and the bending edge of the seal opening notch forming mechanism 9 need to be set according to the virtually U-shaped configuration comprising the seal opening notch N and the bent portion B.

Figure 9:
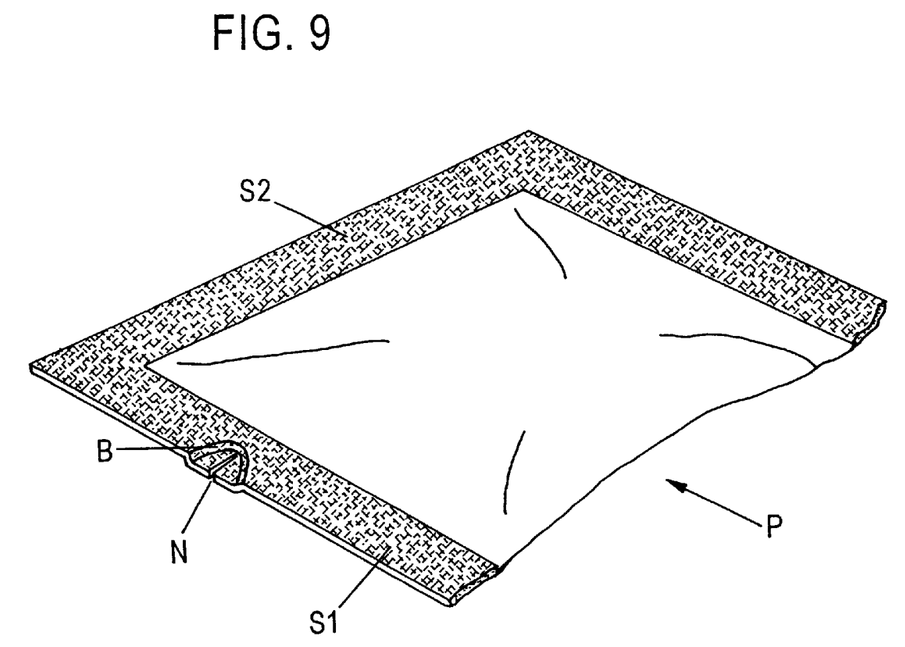
FIG. 9 is an essential-portion perspective view of a package bag according to another embodiment of the invention.

Further, in another embodiment of the package bag P as shown in FIG. 9, the longitudinally sealed portion S1 of the package bag P is formed with a seal opening notch N, which comprises a cut, extending in the direction of depth of the longitudinally sealed portion S1 and with a bent portion B adjacent to the seal opening notch N or cut. In this embodiment, because the seal opening notch N is surrounded by the semicircular bent portion B, the bent portion B provides a stepped portion around the seal opening notch N in the normally flat, longitudinally sealed portion S1. This enables the seal opening portion to be easily located. The geometries of the cutting edge and the bending edge of the seal opening notch forming mechanism 9 in the packaging machine need to be set according to the configuration of the seal opening notch N and the bent portion B. This can be achieved by setting the height of the tip of the bending edge slightly lower than the height of the tip of the cutting edge.

In the embodiments described above, an example case has been explained in which a sheet of film F is drawn out in a two-folded condition and guided, and in which the folded edge part of the folded film, the central part of the folded film F and the opposite edge part (left and right edge parts and the central part) are longitudinally heat-sealed by a pair of three longitudinal heat seal rolls 5A to form two columns of cylindrical package bags P. Other forms of easily openable sealed package bag can be made by forming the seal opening notch of the invention in the sealed package bag.

Figure 10:
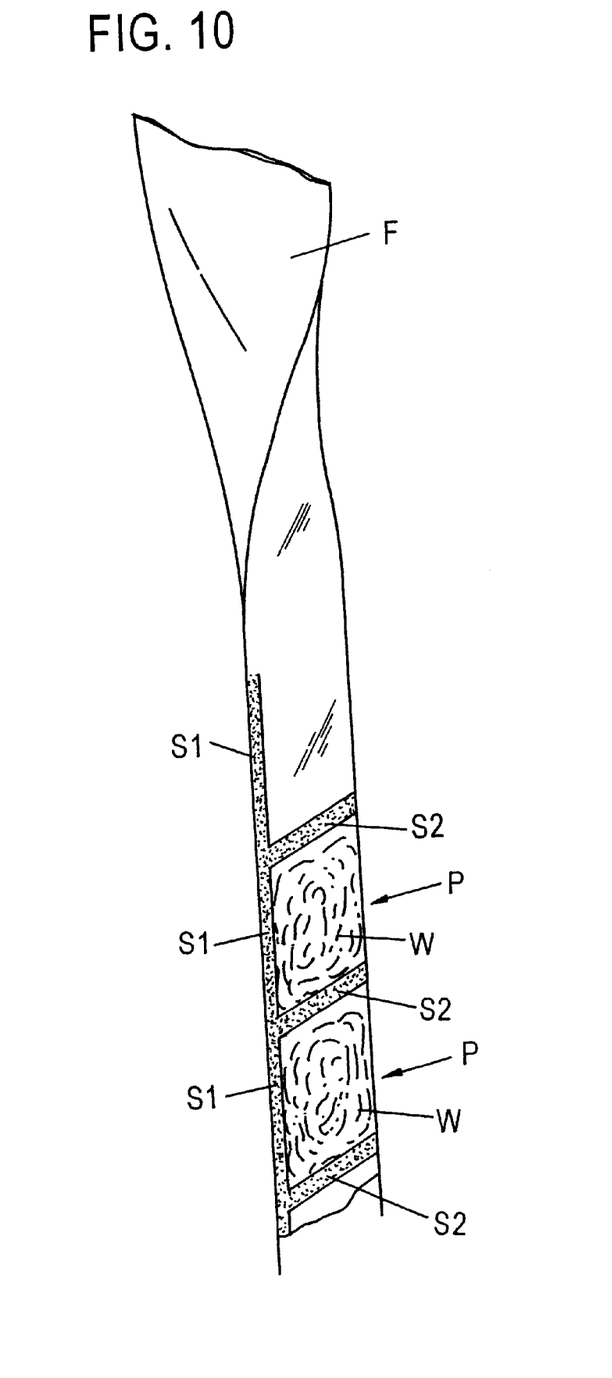
FIG. 10 is a perspective view of a package bag with its three sides sealed, as applied to the conventional apparatus and the invention.
Figure 11:
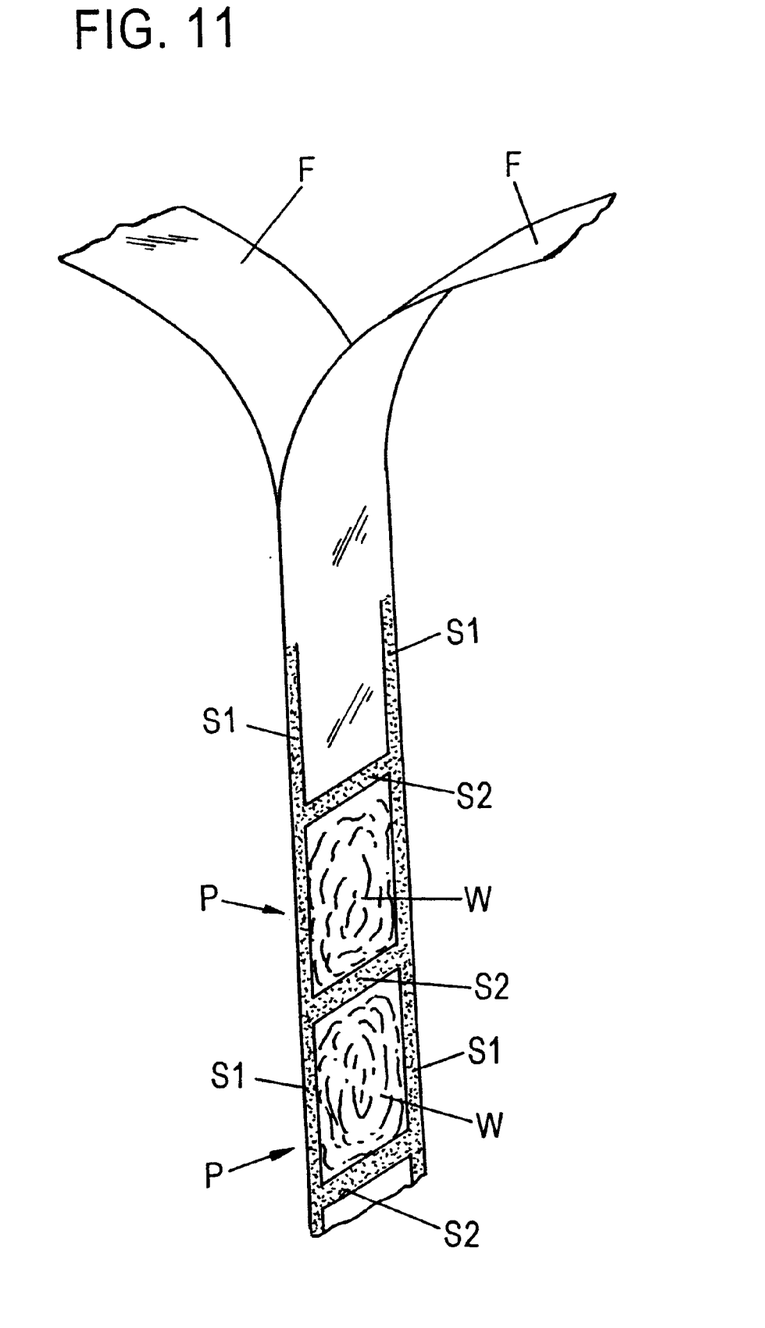
FIG. 11 is a package bag with its four sides sealed, as applied to the conventional apparatus and the invention.

For example, as shown in FIG. 10, the film F may be sealed at three sides of the package bag P; or, as shown in FIG. 11, two sheets of film F may be overlapped, drawn out and guided, and the film F sheets may be longitudinally heat-sealed along their both edges by two longitudinal heat seal rolls while at the same time heat-sealing four sides of the films F to form the package bags P; or, though not shown, a number of longitudinal heat seal rolls may be provided at longitudinal seal portions, and the longitudinal heat seal rolls and the lateral seal portions may be combined to form a number of four-side-sealed package bags in each lateral row; or, the package bags may be sealed individually.

In the easily openable sealed package bag according to the invention, because a seal opening notch N or cut is formed in the sealed portion of the package to extend in the direction of depth of the sealed portion and a bent portion is formed in the sealed portion adjacent to the seal opening notch or cut, a step formed by the bent portion makes the seal opening notch easily identifiable.

Further, because the sealed portion is formed with a seal opening notch or cut extending in the direction of depth of the sealed portion of the package bag and also with a bent portion extending from the deepest part of the seal opening notch or cut toward the outer edge of the sealed portion, a step is easily formed at the outer edge portion where the cut is made, allowing the notch portion or cut to be easily distinguished. At the same time, the combined configuration of the seal opening notch and the bent portion easily forms a step with an almost V- or U-shaped width as a result of bending. This in turn improves the ease with which the seal opening notch can be located by sight as well as touch. Moreover, the seal opening notch and the bent portion may be advantageously incorporated into sealed packages or seals of any shape or geometry. For example, the seal opening notch and the bent portion may be used in a package having only one seal, such as a circular package, having one essentially continuous seal or a package having only two seals, such as a triangular package folded about one side and sealed on the remaining two sides. Thus, it can be seen that the seal opening notch and the bent portion in accord with the invention can assume numerous forms and cover numerous applications. It is also to be noted that the contents of the container, although discussed with relation to liquids, powders, and viscous materials, is not limited to those disclosed embodiments. Instead, the seal opening devices provided herein apply generally to any sealed package containing any object or material and is focused not on the packaged material, but on the improved ease within which the seal opening notch can be located and utilized to open the package to provide access to the material(s) therein.

Further, the packaging machine that continuously makes package bags is characterized in that a notch forming mechanism is provided which comprises a pair of opposing rolls for clamping and transporting the longitudinally sealed portions of the package bags being continuously fed; that the circumferential surface of at least one of the opposing rolls is formed with a protruding cutting edge that makes a seal opening notch or cut in the longitudinally sealed portion of the package bag in such a way that the notch extends in the direction of depth of the longitudinally sealed portion, with the other roll functioning as a receiving roll, and the circumferential surface is also formed with a protruding bending edge that makes a bent portion adjacent to the seal opening notch in the longitudinally sealed portion; and that the height of the tip of the bending edge is set slightly lower than the height of the tip of the cutting edge. This construction can provide an apparatus for manufacturing the easily openable sealed package bag that enables the seal opening portion to be easily located while preventing cut chips from being produced as a result of making cuts.

Further, the packaging machine that continuously makes package bags is characterized in that a notch forming mechanism is provided which comprises a pair of opposing rolls for clamping and transporting the longitudinally sealed portions of the package bags being continuously fed; that the circumferential surface of at least one of the opposing rolls is formed with a protruding cutting edge that makes a seal opening notch or cut in the longitudinally sealed portion of the package bag in such a way that the notch extends in the direction of depth of the longitudinally sealed portion, with the other roll functioning as a receiving roll, and the circumferential surface is also formed with a protruding bending edge that extends continuously from the cutting edge at a position corresponding to the deepest part of the seal opening notch toward the outer edge of the longitudinally sealed portion in order to form the bent portion in the longitudinally sealed portion; and that the height of the tip of the bending edge is set slightly lower than the height of the tip of the cutting edge. This construction can provide an apparatus for manufacturing an easily openable sealed package bag that can prevent cut chips from being produced as a result of making cuts and which can easily form a step at the edge portion where the notch is cut, thus allowing the notch or cut portion, i.e., the seal opening portion, to be easily located.

INDUSTRIAL APPLICABILITY

In making easily openable sealed package bags that can suitably be opened by breaking open a package film or a packaging material with a finger tip, the invention provides an easily openable sealed package bag that can improve the ease with which the package bag can be opened and the ease with which the seal opening portion can be located by sight or by touch, without producing cut chips of the package bag. The invention also provides an apparatus for manufacturing such a package bag.

What is claimed is:

1. An easily openable hermetically sealed package for containing a liquid, powder or viscous material, comprising:
    a seal along at least one edge of an outer portion of the package;
    a seal opening notch comprising a cut formed in the seal to extend from an outer edge of the seal in a direction of depth of the seal to terminate at a base in the seal; and
    a bent portion formed in the seal adjacent the seal opening notch to extend from the outer edge of the seal to terminate at a base in the seal,
    wherein the bent portion forms a depression in one side of the seal portion adjacent the seal opening notch and a corresponding protrusion from the other side of the seal portion adjacent the seal opening notch, and
    wherein the bent portion further comprises a flattened portion adjacent a leg of the depression and corresponding protrusion.

2. An easily openable sealed package bag according to claim 1, wherein a geometry comprising the seal opening notch and the bent portion is shaped like a letter V or U.

3. An easily openable sealed package bag according to claim 1, wherein the seal opening notch comprises a cut formed to extend at least substantially through a thickness of the seal.

4. A package opening device for a package, the opening device formed by:

cutting through a material forming the package seal to form a notch in a seal extending from an outer edge of the seal toward an inner edge of the seal to terminate at a base in the seal; and bending a portion of the material forming the package seal adjacent the notch to form a depression in one side of the seal and a corresponding protrusion from the other side of the seal and to form a flattened portion adjacent a leg of the depression and corresponding protrusion.

5. An opening device for a package, comprising:

a package comprising a seal along at least one edge of an outer portion of the package;

a notch formed through the seal extending from an outer edge of the seal toward an inner edge of the seal;

a stepped portion formed in the seal adjacent the notch, said stepped portion further comprising a flattened portion in which said notch is formed, wherein the stepped portion forms a depression in one side of the seal and a corresponding protrusion from the other side of the seal, said flattened portion being formed adjacent a leg of the depression and corresponding protrusion, wherein the notch forms a weak portion in the material to facilitate tearing of the package material, and wherein the stepped portion provides at least one of a tactile and visual indicator of a position of the notch on the package.

6. An opening device for a package according to claim 5, wherein the stepped portion intersects the notch.

7. An opening device for a package according to claim 5, wherein the stepped portion intersects a base of the notch.

8. An opening device for a package, comprising:

a package comprising a seal along at least one edge of an outer portion of the package;

a notch formed through the seal extending from an outer edge of the seal toward an inner edge of the seal; and a stepped portion formed in the seal adjacent the notch, said stepped portion further comprising a flattened portion in which said notch is formed, wherein the stepped portion at least partially circumscribes the notch, wherein the stepped portion forms a depression in one side of the seal and a corresponding protrusion from the other side of the seal, said flattened portion being formed adjacent a leg of the depression and corresponding protrusion, wherein the notch forms a weak portion in the material to facilitate tearing of the package material, and wherein the stepped portion provides at least one of a tactile and visual indicator of a position of the notch on the package.

9. A process for forming an opening device for a package, comprising:

cutting through a package seal to form a cut portion through a seal extending from an outer edge of the seal toward an inner edge of the seal to terminate at a base in the seal; and bending a portion of the material forming the package seal adjacent the cut portion to form a depression in one side of the seal and a corresponding protrusion from the other side of the seal and to form a flattened portion adjacent a leg of the depression and corresponding protrusion in which said notch is formed.

10. A process for forming an opening device for a package according to claim 9, further comprising:

folding over a single sheet of a material and sealing the folded over material on three sides or abutting two separate sheets of material in opposition to one another and sealing the abutting material on four sides to form a package having a cavity for containing a product therein.

11. A process for forming an opening device for a package according to claim 10, wherein the bending step comprises bending a portion of the package seal material contiguous with the cut portion.

12. A process for forming an opening device for a package according to claim 10, wherein the bending step comprises bending a portion of the material forming the package seal along a line intersecting a base of the cut portion.

* * * * *